(12) United States Patent
Knoulich

(10) Patent No.: US 9,940,221 B2
(45) Date of Patent: Apr. 10, 2018

(54) SYSTEM AND METHOD FOR TESTING DATA REPRESENTATION FOR DIFFERENT MOBILE DEVICES

(71) Applicant: GMC SOFTWARE AG, Appenzell (CH)

(72) Inventor: Jan Knoulich, Hradec Kralove (CZ)

(73) Assignee: GMC SOFTWARE AG, Appenzell (CH)

( * ) Notice: Subject to any disclaimer, the term of this patent is extended or adjusted under 35 U.S.C. 154(b) by 0 days.

(21) Appl. No.: 15/039,228

(22) PCT Filed: Nov. 18, 2014

(86) PCT No.: PCT/EP2014/003082
§ 371 (c)(1),
(2) Date: May 25, 2016

(87) PCT Pub. No.: WO2015/078566
PCT Pub. Date: Jun. 4, 2015

(65) Prior Publication Data
US 2017/0024308 A1    Jan. 26, 2017

(30) Foreign Application Priority Data

Nov. 27, 2013 (CH) ...................... 1973/13

(51) Int. Cl.
*H04L 29/06* (2006.01)
*H04L 29/08* (2006.01)
(Continued)

(52) U.S. Cl.
CPC ............ *G06F 11/3664* (2013.01); *G06F 8/38* (2013.01); *G06F 8/60* (2013.01); *G06F 8/71* (2013.01);
(Continued)

(58) Field of Classification Search
CPC ..... H04L 43/50; H04L 12/2697; H04L 67/04; H04L 67/02; H04L 67/306; H04L 63/08;
(Continued)

(56) References Cited

U.S. PATENT DOCUMENTS 8,078,448 B1    12/2011   Wohlberg et al.
8,589,140 B1 *  11/2013   Poulin ................. G06F 11/3457
                                                             463/42

(Continued)

FOREIGN PATENT DOCUMENTS

WO    WO 2008/031070 A2    3/2008

OTHER PUBLICATIONS

F. Barros, Modeling and simulation of mobile phones using dynamic topologies, Mar. 2012, 8 pages.*
(Continued)

*Primary Examiner* — Thuy Dao
(74) *Attorney, Agent, or Firm* — Knobbe, Martens, Olson & Bear LLP

(57) ABSTRACT

For generating an application program (15) from a plurality of application program modules (12), a computerized application platform (1) comprises an application configuration module (11) configured to receive from a user of a communication terminal instructions, for defining a selection of the application program modules (12), and to generate an application program (15) using the selected application program modules (12). The application platform (1) further comprises a plurality of device profiles (13) for different types of mobile communication devices. Each device profile (13) includes hardware characteristics of a different type of mobile communication device. Furthermore, a testing module (111) is configured to emulate the application program (15) for the different types of mobile communication devices using the device profiles (13) and to transmit to the user of
(Continued)

the communication terminal test output data generated by emulating the application program (15) for at least one type of the mobile communication devices.

13 Claims, 9 Drawing Sheets

(51) Int. Cl.
| | | |
|---|---|---|
| *G06F 15/16* | (2006.01) | |
| *H04W 12/06* | (2009.01) | |
| *G06F 11/36* | (2006.01) | |
| *G06F 9/445* | (2018.01) | |
| *G06F 9/44* | (2018.01) | |
| *G06F 9/455* | (2018.01) | |

(52) U.S. Cl.
CPC ...... *G06F 9/45504* (2013.01); *G06F 11/3652* (2013.01)

(58) Field of Classification Search
CPC ..... A61B 5/121; A61B 5/123; G06F 11/3664; G06F 8/38; G06F 8/60; G06F 8/71
See application file for complete search history.

(56) References Cited

U.S. PATENT DOCUMENTS

| | | | | |
|---|---|---|---|---|
| 9,298,864 | B2* | 3/2016 | Poulin | G06F 11/3457 |
| 9,374,436 | B2* | 6/2016 | Hershberg | H04L 67/2814 |
| 2006/0277231 | A1 | 12/2006 | Kral et al. | |
| 2007/0157160 | A1* | 7/2007 | Arend | G06F 3/048 |
| | | | | 717/105 |
| 2012/0015644 | A1* | 1/2012 | Danford | H04L 41/0893 |
| | | | | 455/419 |
| 2014/0075420 | A1* | 3/2014 | Queru | G06F 9/4411 |
| | | | | 717/134 |
| 2014/0250419 | A1* | 9/2014 | Ivmark | G06F 8/20 |
| | | | | 717/101 |
| 2016/0011756 | A1* | 1/2016 | Afzal | H04L 67/02 |
| | | | | 715/747 |

OTHER PUBLICATIONS

Bauset et al., Performance Characterization on Mobile Phones for Collaborative Augmented Reality (CAR) Applications, Sep. 2011, 2 pages.*
International Search Report for International Application No. PCT/EP2014/003082, dated Feb. 10, 2015.

* cited by examiner

SYSTEM AND METHOD FOR TESTING DATA REPRESENTATION FOR DIFFERENT MOBILE DEVICES

FIELD OF THE INVENTION

The present invention relates to a computerized development platform and a computer implemented method for testing data representation for displays of different types of mobile communication devices. Specifically, the present invention relates to a computerized development platform and a computer implemented method for testing data representation for displays of different types of mobile communication devices, using a plurality of device profiles that include size and resolution of a display screen of the different types of mobile communication devices.

BACKGROUND OF THE INVENTION

For various use cases and scenarios, there is a wide spread need for application programs that are related to data input and data output. Typically, for related or identical use cases, such data entry and data output application programs are very similar with respect to their sequence of work and/or data flow, associated data content, and functional requirements. Nevertheless, despite the existing similarities and correspondence, these types of application programs are developed independently many times over, thereby, wasting time and resources. In some cases, generic tools, such as data spreadsheet programs have been used as the basis for implementing data entry and data output applications. However, with the increasing trend towards mobile computing, the performance of such generic approaches has been found less than satisfactory, largely because of the complexity and size of the underlying generic tools that have to be installed on the mobile computing/communication devices, despite the fact that only a very small subset of their functions and features are actually used. Again, it was considered more efficient to develop individual application programs which could be loaded as small apps onto the mobile devices. While the individual-app-based approach may be well suited for very specific functions and applications, it does not seem efficient for the aforementioned data input/output application programs which may differ from each other essentially only with respect to the involved transaction parties and associated data bases. The almost endless variety of different types, brands, makes, models, and respective hardware and software configurations of mobile devices bring further complications and complexities for developing, testing, deploying, and maintaining application programs that are related to data input and data output. Particularly, the great differences in size and resolution of the display screens of the mobile devices make it extremely difficult to ensure the correct presentation of textual and numeric data content across this diversity of mobile devices, with respect to location, size, visibility, and readability on the display screens.

U.S. Pat. No. 8,078,448 describes a system for automated testing where computing devices, such as mobile devices, may be emulated so that the physical devices are not needed for testing. The emulator may create the script for a device from a device profile that contains the characteristics of the computing device. An application may be tested on a device emulated from a device profile. To test the application, a user interacts with the emulated device as if the emulated device is the physical device. The application is viewed on the display of the emulated device. Display refresh rates for a device may vary between devices and between different device profiles.

US 2006/0277231 describes an integrated software development and porting system for wireless devices, e.g. cellular phones, which includes wireless device selector, a universal and concurrent emulator, a build and porting engine, a resource manager, and a provisioning server. The emulator can automatically emulate selected devices and automatically and concurrently test source code on the emulated devices. The build and porting engine provides the executable computer programs to the provisioning server, which provides the executable computer programs to respective wireless devices. The emulator also allows the emulated devices to receive simultaneously for testing one or more inputs, e.g. button presses or network data. The wireless devices have different attributes such as screen resolution, keyboard mapping, supported application programming interfaces, connectivity, image formats, audio formats, cameras, interface connections, and carriers. Emulated devices may have different attributes, e.g. different screen sizes, different layout of the keys, or different audio capabilities.

WO 2008/031070 describes a software development environment for platform-independent application programs that includes a target environment simulator which utilizes profiles to establish features for each target platform, e.g. CPU speed, I/O characteristics, or interface/interconnections, such that each target platform emulates the behavior of a particular computing device, e.g. a mobile device, as defined by the profiles. An application may be tested on multiple emulated devices simultaneously, with the emulated output originating from the executing application being displayed for each device on a single screen. Application settings may be related to a display window that simulates the display of a specified real mobile phone, where outputs generated by a running game are displayed. An area of the display window that provides graphic output is scaled to match the display size of the mobile phone being simulated. An application may be implemented using script objects and re-useable software modules stored in an object library. The software modules may be platform-independent and deployable across different target platforms having different architectures and operating systems. An archiver saves an archive of one or more applications of different versions that have been built using the development environment.

While the prior art systems assist developers in defining and testing applications through emulation of the applications for different hardware platforms, they do not address the issues of presenting textual and numeric data correctly across a variety of mobile devices.

SUMMARY OF THE INVENTION

It is an object of this invention to provide a computerized development platform and a computer implemented method for testing data representation for displays of different types of mobile communication devices.

According to the present invention, these objects are achieved through the features of the independent claims. In addition, further advantageous embodiments follow from the dependent claims and the description.

According to the present invention, the above-mentioned objects are particularly achieved in that, for testing data representation for displays of different types of mobile communication devices, a development platform comprises a plurality of device profiles, each device profile including a size of a display screen and a resolution of the display screen of one of the different types of mobile communication devices. The development platform further comprises one or more processors configured to emulate display screens of the different types of mobile communication devices, the emulated display screens having different sizes and resolutions, as defined by the respective device profiles. The one or more processors are further configured to show representations of a plurality of the emulated display screens concurrently on a display of a developer, to retrieve input data from a data source, and to display the input data as content in the representations of the plurality of the emulated display screens concurrently on the display of the developer. Showing concurrently on a developer's display unit the emulated display screens of a plurality of mobile communication devices and the emulated display of data in the emulated display screens makes it possible for the developer to compare concurrently and on one display unit the presentation of data, particularly, textual and numeric data, on display screens of a variety of mobile communication devices.

In an embodiment, the processors are further configured to receive, for data elements of the input data, a configuration parameter that indicates for a data element whether it is to be displayed as a mandatory data element on the display screens of all of the different types of mobile communication devices, to check whether a mandatory data element is indeed displayed concurrently in all of the representations of the emulated display screens, and to generate a warning signal in case that a mandatory data element is not displayed concurrently in all of the representations of the emulated display screens.

In another embodiment, the processors are further configured to emulate a program module for the different types of mobile communication devices, using hardware and software characteristics of the different types of mobile communication devices included in the device profiles, the emulated program module generating a presentation of the input data as content in each of the emulated display screens, the presentation of content corresponding to a presentation generated by a processor of the respective type of mobile communication device under direction of the program module.

In yet another embodiment, the processors are further configured to emulate a program module for the different types of mobile communication devices, using hardware and software characteristics of the different types of mobile communication devices included in the device profiles, the emulated program module generating in each of the emulated display screens a user interface element, that enables user interaction, and displaying the input data as content in the representations of the emulated display screens, in response to the user interaction, the user interface element corresponding to a user interface element generated by a processor of the respective type of mobile communication device under direction of the program module.

In an embodiment, the processors are further configured to retrieve from the data source an interactive data object, to extract from the interactive data object the input data and a program module, to emulate the program module for the different types of mobile communication devices, using hardware and software characteristics of the different types of mobile communication devices included in the device profiles, the emulated program module generating in each of the emulated display screens a user interface element, that enables user interaction, and generating a presentation of the input data as content in each of the emulated display screens, in response to the user interaction, the user interface element corresponding to a user interface element generated by a processor of the respective type of mobile communication device under direction of the program module, and the presentation of content corresponding to a presentation generated by a processor of the respective type of mobile communication device under direction of the program module.

In another embodiment, the processors are further configured to retrieve from the data source a data object, to extract from the data object the input data and configuration parameters that indicate for data elements of the input data the types of mobile communication devices on which the respective data element is to be displayed, and to display the data elements respectively in the representations of the emulated display screens of those types of mobile communication devices indicated by the configuration parameters.

In another embodiment, the processors are further configured to check whether the input data displayed as content in the representations of the emulated display screens meets one or more of the following visual impairment conditions: visibility for color blindness, minimum font size, and a minimum readability score.

In addition to a computer system, implementing a computerized development platform, the present invention also relates to a computer-implemented method for testing data representation for displays of different types of mobile communication devices. The method comprises storing a plurality of device profiles, whereby each device profile includes a size of a display screen and a resolution of the display screen of one of the different types of mobile communication devices. A processor emulates display screens of the different types of mobile communication devices, whereby the emulated display screens have different sizes and resolutions, as defined by the respective device profiles. The processor shows representations of a plurality of the emulated display screens concurrently on a display of a developer. The processor retrieves input data from a data source and displays the input data as content in the representations of the plurality of the emulated display screens concurrently on the display of the developer.

In addition to a computer system, implementing a computerized development platform, and a computer implemented method for testing data representation for displays of different types of mobile communication devices, the present invention also relates to a computer program product comprising a non-transitory computer readable medium having stored thereon computer program code configured to control one or more processors of a computer system such that the computer system performs the steps of: storing a plurality of device profiles, each device profile including a size of a display screen and a resolution of the display screen of one of the different types of mobile communication devices; emulating display screens of the different types of mobile communication devices, the emulated display screens having different sizes and resolutions, as defined by the respective device profiles; showing representations of a plurality of the emulated display screens concurrently on a display of a developer; retrieving input data from a data source; and displaying the input data as content in the representations of the plurality of the emulated display screens concurrently on the display of the developer.

In another aspect of the present invention, for generating an application program or an interactive data object for mobile communication devices from one or more application program modules, a plurality of device profiles for different types of the mobile communication devices are stored in a computer system, whereby each device profile includes hardware and/or software characteristics of a different type of mobile communication device. In the computer system, instructions are received via a telecommunications network from a user of a communication terminal. The instructions define a selection of the application program modules and configuration parameters for the application program modules or interactive data objects. The application program or the interactive data object is generated by the computer system using the selection of application program modules and the configuration parameters. The computer system emulates the application program or interactive data object for the different types of mobile communication devices using the device profiles. The computer transmits to the user of the communication terminal test output data generated by emulating the application program or the interactive data object for at least one type of the mobile communication devices. The test output data includes representations of display screens of the at least one type of the mobile communication devices. The computer system generates an operable release of the application program or the interactive data object. The operable release of the application program or the interactive data object is transmitted from the computer system to the mobile communication devices for execution on the mobile communication devices, e.g. in response to a download request from the user. Thus, the computer system implements a computerized application platform for generating efficiently and in one integral system an application program or an interactive data object from selected application program modules, testing the application program or the interactive data object, altering the application program or the interactive data object, if desired and/or necessary, and deploying the application program or the interactive data object for download and execution on mobile communication devices.

In an embodiment, the test output data includes representations of display screens and related interaction capabilities of the at least one type of the mobile communication devices. For example, the interaction capabilities associated with the display screens include data entry through a hardware based keyboard and/or through a touch screen, and manipulations and/or navigation by way of multi touch screen gestures such as swiping, pinching, spreading, etc.

If alteration of the application program or the interactive data object is desired, the computer system generates a revised version of the application program or the interactive data object, using a revised selection of the application program modules and/or alternate configuration parameters for the application program modules, as defined by alternate instructions received from the user of the communication terminal. For generating an operable release of the application program or the interactive data object, in the computer system, instructions are received from the user of the communication terminal to generate an operable release of the application program or the interactive data object using a finalized selection of the application program modules and configuration parameters for the application program modules.

In an embodiment, the computer system selects for testing one or more types of mobile communication devices by determining compatibility levels for the different types of mobile communication devices with respect to the application program or the interactive data object, whereby the compatibility levels indicate to which extent the different types of mobile communication devices meet hardware and/or software requirements of the application program or the interactive data object. The computer system emulates the application program or the interactive data object for those types of mobile communication devices that do not meet a defined minimum compatibility level. Automatic performance of the compatibility assessment for the different types of mobile communication devices and automatic selection for testing of those types showing a possibly insufficient compatibility have the advantage that the amount of testing can be reduced and overall efficiency in generating the application program or the interactive data object is thereby increased. Moreover, the compatibility assessment may indicate to a developer the percentage of compatible or incompatible types of mobile communication devices so that the configuration of the application program or the interactive data object may be altered to achieve a higher compatibility rate, before extensive testing of the application program or the interactive data object is even started.

In an embodiment, the computer system receives instructions from the user of the communication terminal for enabling in the application program or the interactive data object a transaction reporter associated with a specific function of the application program or the interactive data object. The transaction reporter is configured to generate and transmit to the computer system a transaction record, upon execution of the specific function on a mobile communication device. The transaction record is received from the mobile communication device in the computer system where it is stored in a transaction log. Thus, simply by providing a respective instruction, the user enables the application program or the interactive data object to generate and report back to the computer system transaction records regarding the execution of specific functions on a mobile communication device.

In a further embodiment, the computer system generates and stores a deployment transaction record, upon generating and storing the operable release of the application program or the interactive data object for downloading by the mobile communication devices. The deployment transaction record includes a cryptographic signature of the operable release of the application program or the interactive data object.

The recording of transaction records makes it possible to produce respective audit trails.

In another embodiment, the computer system receives from the user of the communication terminal a rollback instruction for disabling for the mobile communication devices access to a first operable release of the application program or the interactive data object which has a different release date than a second operable release of the application program or the interactive data object, respectively. The computer system enables for the mobile communication devices access to the second operable release of the application program or the interactive data object and generates and stores a rollback transaction record. The rollback transaction record includes a cryptographic signature of the first operable release of the application program or the interactive data object.

In an embodiment, the computer system receives instructions from the user of the communication for defining a workflow sequence for the selection of application program modules. The computer system generates the application program or the interactive data object using the workflow sequence. The computer system receives from the user of the communication terminal instructions for starting the application program or the interactive data object and navigating through the application program or the interactive data object, and data input for the application program modules of the application program. The computer system emulates the application program or the interactive data object using the instructions, the data input, and test input data associated with data sources referenced by the application program or the interactive data object. The computer system generates and tests a revised version of the application program or the interactive data object using a revised workflow sequence defined by alternate instructions received from the user of the communication terminal. The computer system generates the operable release of the application program or the interactive data object using a finalized selection of the workflow sequence.

Depending on the embodiment, the device profiles include size of display screen, resolution of display screen, refresh rate of display screen, presence of graphics hardware acceleration, keyboard capabilities, touch screen capabilities, interaction capabilities, camera capabilities, camera resolution, communication capabilities, typical communication speed, type of processor, peed of processor, size of memory, type of operating system, and/or version of operating system of the mobile communication devices.

In yet another embodiment, the computer system receives instructions from the user of the communication for defining one or more data sources for at least one of the application program modules. The computer system generates the application program or the interactive data object using the data sources. The computer system emulates the application program or the interactive data object using test input data associated with the data sources of the application program or the interactive data object. The computer system transmits to the user of the communication terminal test output data based on the test input data. The computer system generates and tests a revised version of the application program or the interactive data object using one or more alternate data sources defined by alternate instructions received from the user of the communication terminal. The computer system generates the operable release of the application program or the interactive data object using a finalized selection of the data sources.

In addition to a computer system, implementing a computerized application platform, and a computer implemented method for generating for mobile communication devices an application program or an interactive data object from one or more of application program modules, in another aspect the present invention also relates to a computer program product comprising a non-transitory computer readable medium having stored thereon computer program code configured to control one or more processors of a computer system such that the computer system stores a plurality of device profiles for different types of mobile communication devices, each device profile including hardware and/or software characteristics of a different type of mobile communication devices; receives via a telecommunications network from a user of a communication terminal instructions for defining a selection of application program modules and configuration parameters for the application program modules; generates an application program or an interactive data object using the selection of application program modules and the configuration parameters; emulates the application program or the interactive data object for the different types of mobile communication devices using the device profiles; transmits to the user of the communication terminal test output data generated by emulating the application program or the interactive data object for at least one type of the mobile communication devices, the test output data including representations of display screens of the at least one type of the mobile communication devices; generates an operable release of the application program or the interactive data object; and transmits the operable release of the application program or the interactive data object to the mobile communication devices for execution on the mobile communication devices.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
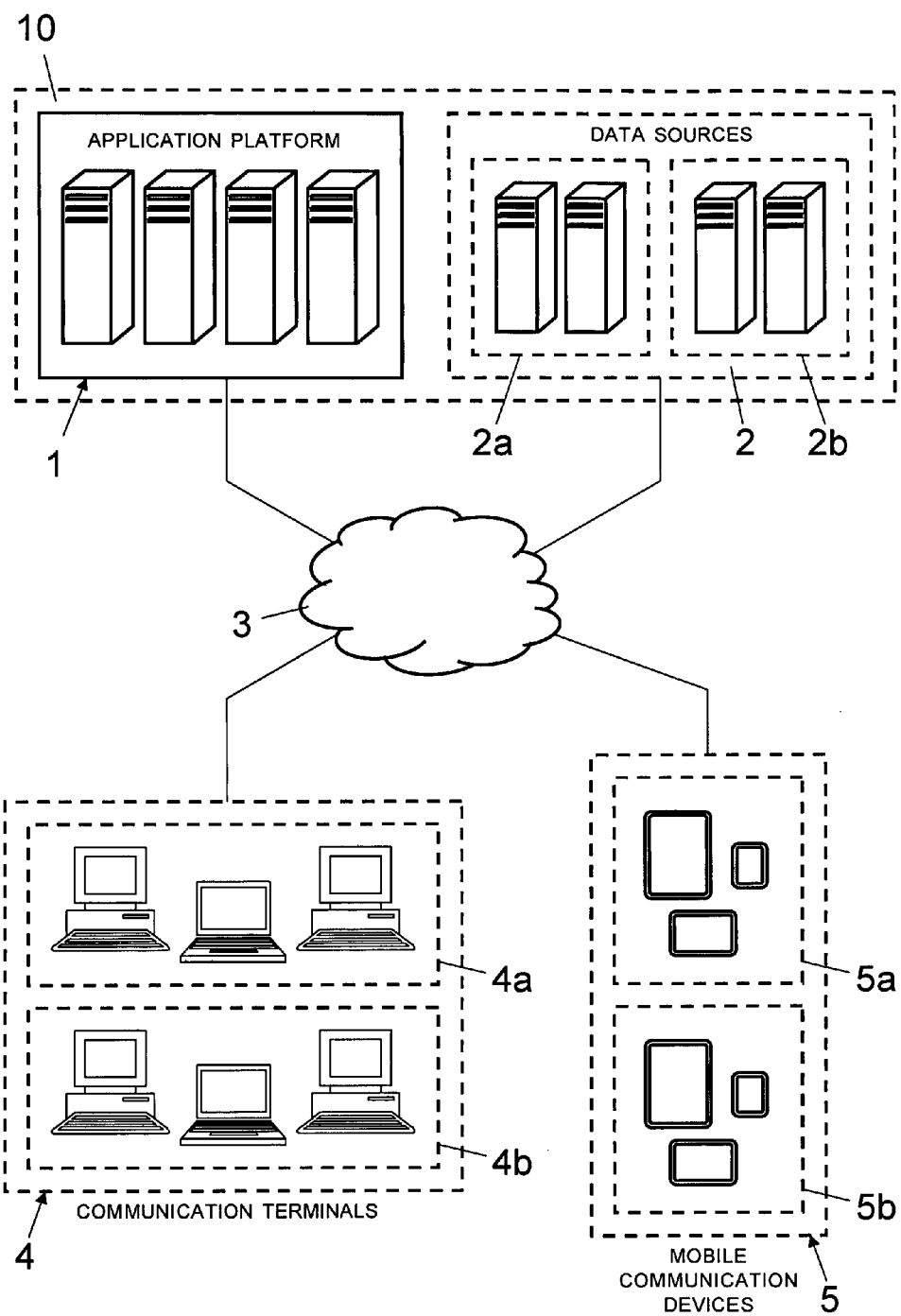
FIG. 1: shows a block diagram illustrating schematically a computerized application platform which comprises a plurality of application program modules and is accessible to mobile communication devices and communication terminals via a telecommunications network.
Figure 2:
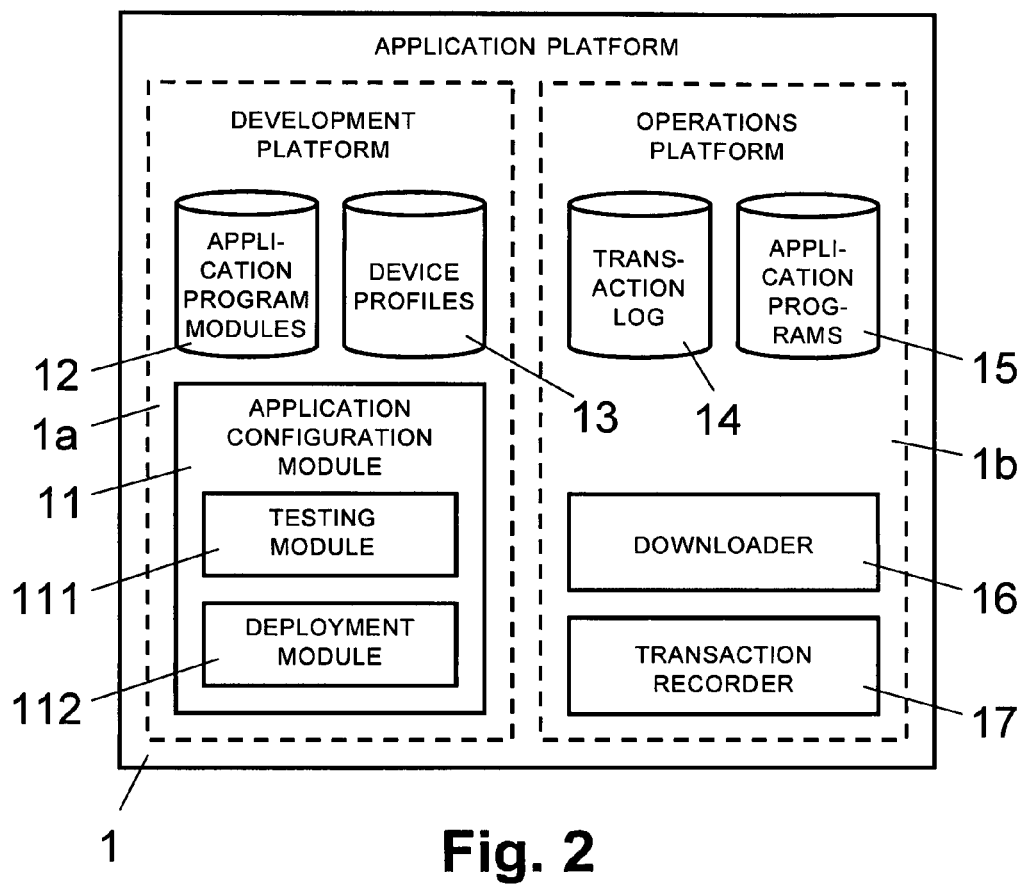
FIG. 2: shows a computerized application platform with a development platform, for generating and testing application programs or interactive data objects, and an operations platform, for deploying and downloading the application programs or the interactive data objects.

In FIGS. 1 and 2, reference numeral 1 refers to a computer system or to a computerized application platform, implemented on the computer system. As illustrated in FIG. 1, the computerized application platform 1 comprises one or more computers with one or more processors.

In FIG. 1, reference numeral 2 refers to data sources, specifically data sources 2 implemented on one or more computers which are connected to or comprise data stores. As indicated schematically in FIG. 1*by* reference numerals 2*a* and 2*b*, the data sources 2 may be associated with a plurality of different data providers and implemented on different computer systems. As further indicated schematically in FIG. 1*by* reference numeral 10, in an embodiment, at least some of the data sources 2, 2*a*, 2*b* are implemented together with the computerized application platform 1 in a common computer system or computer centre.

As illustrated in FIG. 1, the computerized application platform 1 and the data sources 2, 2*a*, 2*b* are accessible to communication terminals 4, 4*a*, 4*b* and mobile communication devices 5, 5*a*, 5*b* via a telecommunications network 3. Accordingly, the computerized application platform 1, the data sources 2, 2*a*, 2*b*, the communication terminals 4, 4*a*, 4*b*, and the mobile communication devices 5, 5*a*, 5*b* are provided with communication modules configured for data communication via telecommunications network 3. The telecommunications network 3 includes the Internet and comprises fixed networks and/or wireless networks such as GSM-networks (Global System for Mobile communication), UMTS-networks (Universal Mobile Telephone System) or other mobile radio telephone systems, and/or wireless local area networks (WLAN) for accessing the Internet.

The communication terminals 4, 4*a*, 4*b* include fixed and mobile personal computers, e.g. desktop, laptop, notebook, and/or tablet computers. As indicated schematically in FIG. 1*by* reference numerals 4*a* and 4*b*, the communication terminals 4 may be associated with a plurality of development teams from different user groups of the computerized application platform 1, e.g. developers of different companies that are customers of the computerized application platform 1.

The mobile communication devices 5, 5*a*, 5*b* include mobile radio phones, laptop, notebook, and/or tablet computers. As indicated schematically in FIG. 1*by* reference numerals 5*a* and 5*b*, the mobile communication devices 5 may be associated with a plurality of different target user groups of the computerized application platform 1, e.g. groups of users that are employees or clients of different companies that are customers of the computerized application platform 1.

As illustrated in FIG. 2, the computerized application platform 1 comprises various functional modules and data stores. As indicated schematically in FIG. 2 by reference numerals 1*a* and 1*b*, the functional modules and data stores are grouped into those that are associated with a (computerized) development platform 1*a* and those that are associated with an operations platform 1*b*. For example, the operations platform 1*b* is implemented as an Internet based application store.

The functional modules of the development platform 1*a* include an application configuration module 11 a testing module 111, and a deployment module 112. The functional modules of the operations platform 1*b* include a downloader 16 and a transaction recorder 17. The functional modules are implemented as programmed software modules comprising computer code configured to control one or more processors of the computerized application platform 1. The computer code is stored on a non-transient, computer readable medium which is connected in a fixed or removable fashion with the processor(s) of the computerized application platform 1. One skilled in the art will understand that in alternative embodiments, the functional modules can be implemented partly or fully by way of hardware modules.

The data stores of the development platform 1*a* include a data store with application program modules 12 and a data store with device profiles 13. The data stores of the operations platform 1*b* include a data store with transaction logs 14 and a data store with operable application programs 15. The data stores include data memory and/or disk storage and may further include file systems and/or database systems for managing and controlling access to their respective data content.

The device profiles 13 include hardware and/or software characteristics of different types of mobile communication devices 5. For example, the device profiles 13 include for different types of mobile communication devices 5 hardware characteristics such as interface features, including the size of the display screen, the resolution of the display screen, refresh rate of the display screen, presence and type of graphics hardware acceleration, e.g. for animation and/or 3D presentation, presence of keyboard, (multi-) touch screen capabilities, presence of front and/or back side cameras, and/or camera resolution; communication features including supported communication modules, e.g. Bluetooth, NFC (Near Field Communication), WLAN (Wireless Local Area Network), 3G or 4G (third or fourth generation of mobile radio telecommunications technology), etc., and/or supported and typical communication speed or bandwidth; and/or computing features, including the type of processor, the speed of the processor, and/or the size of memory of the mobile communication devices 5. Moreover, the device profiles 13 include for different types of mobile communication devices 5 software characteristics such as type of operating system, version/release of operating system, supported interaction capabilities, e.g. zooming and/or pinching functions on a touch screen, etc.

Figure 7:
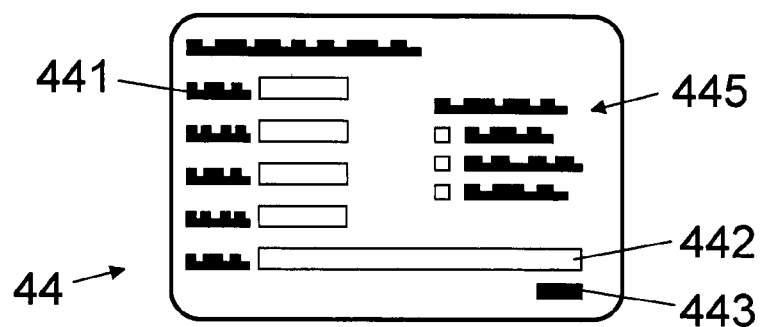
FIG. 7: shows a schematic depiction of a display screen displaying data output generated by an application program module which is related to data entry and includes labels and data entry fields associated with these labels.
Figure 8:
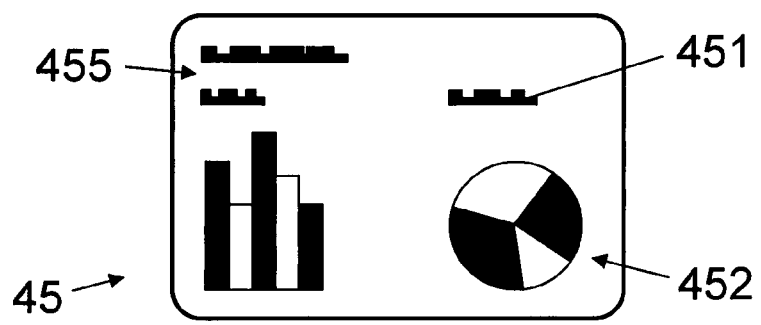
FIG. 8: shows a schematic depiction of a display screen displaying data output generated by an application program module which is related to graphical data representation.
Figure 9:
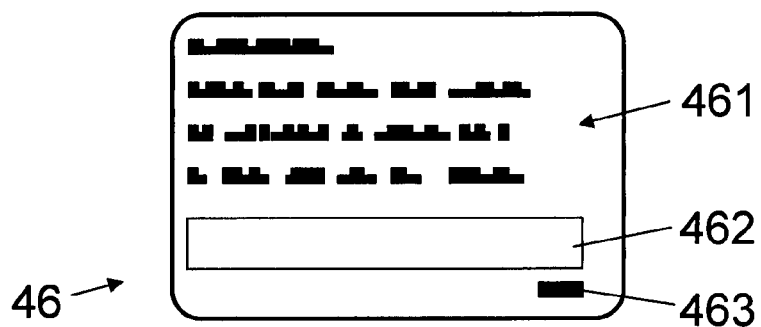
FIG. 9: shows a schematic depiction of a display screen displaying data output generated by an application program module which is related to transaction completion and/or entry of a signature.

The application program modules 12 include executable code or interpretable instructions for controlling a processor or a virtual machine, respectively, on a mobile communication device 5. At least some of the application program modules 12 are configured to generate data output on a display screen of a mobile communication device 5. In an embodiment, the application program modules 12 are categorized by different types of use cases or fields of application, e.g. forms based applications such as traffic violation recording and fine issuance, sales contracts, insurance underwriting, etc. The application program modules 12 are further categorized into different classes or groups, for example application program modules 12 related to data entry, data representation, e.g. rendering of textual and/or numeric data values, graphical data representation, entry of signature, or combinations thereof. FIGS. 7-9 illustrate data output on a display screen generated by different application program modules 12. Specifically, FIG. 7 shows an example of data output, generated by an application program module 12 related to data representation and data entry. Specifically, a forms based application program module 12 which includes textual and/or numeric data values 445, labels 441, data entry fields 442 associated with these labels 441, and graphical user elements 443, e.g. a command button, for controlling execution of the application program module 12, e.g. by clearing or saving data entered by a user, displaying further data content, and/or navigating backwards or forwards in the application program 15, from one form or application program module 12 to the next. FIG. 8 shows an example of data output, generated by an application program module 12 related to graphical data representation, including textual and/or numeric data values 455, labels 451 and associated data graphs 452, such as bar or pie charts, etc. Data output related to data representation may be characterized by further display capabilities such as 3D and/or animation effects. FIG. 9 shows an example of data output generated by an application program module 12 related to transaction completion and/or entry of a signature, including text and numbers 461, a signature entry field 462, and graphical user elements 463. The signature entry field 462 is configured to receive from a user a signature via a touch screen, e.g. through entry by way of a pen-shaped device or per finger. The application program module 12 related to transaction completion or data storage is configured to generate and transmit data records to the application platform 1 or a defined data store.

Figure 10:
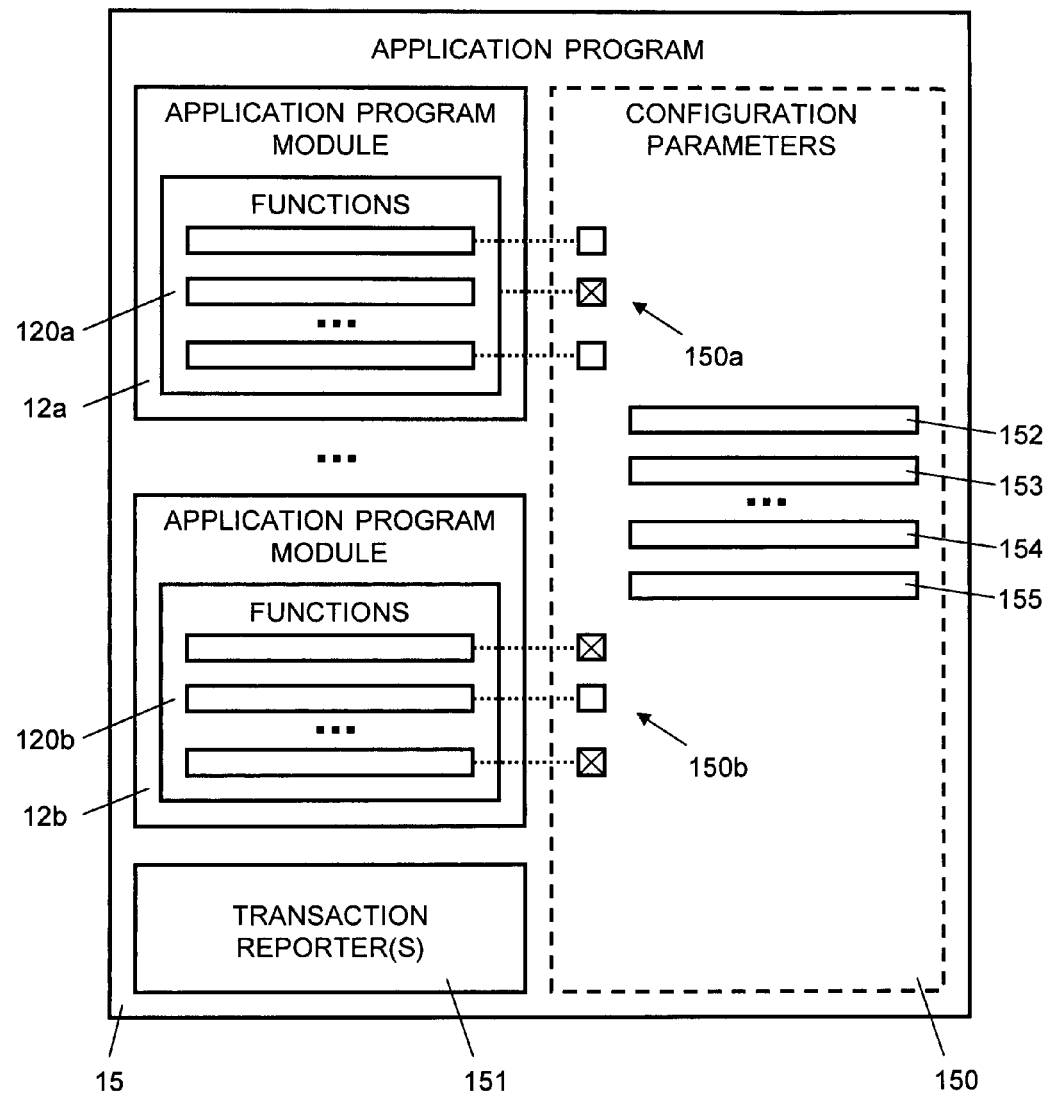
FIG. 10: shows a block diagram illustrating schematically an application program comprising a plurality of application program modules, configuration parameters, and a transaction reporter.

FIG. 10 illustrates schematically an example of an application program 15 comprising a plurality of application program modules 12a, 12b, configuration parameters 150, and a transaction reporter 151. As illustrated, the application program modules 12a, 12b include one or more (software/program) functions 120a, 120b. In the example of FIG. 10, the configuration parameters 150 include configuration parameters 150a, 150b which indicate for associated functions 120a, 120b or application program modules 12a, 12b (as indicated with dotted lines) that a transaction reporter 151 is to be activated for the respective function 120a, 120b (as indicated with check marks). The transaction reporter 151 is configured to generate and transmit to the computerized application platform 1 a transaction record, upon execution of the respective application program module 12a, 12b or specific function 120a, 120b, respectively, on a mobile communication device 5. Further configuration parameters 150 include definition 152 of data sources 2, data stores for storing data output 153, data validation rules 154 for checking (conformity and plausibility) of data input, workflow sequences 155 for application program modules, etc.

Figure 4:
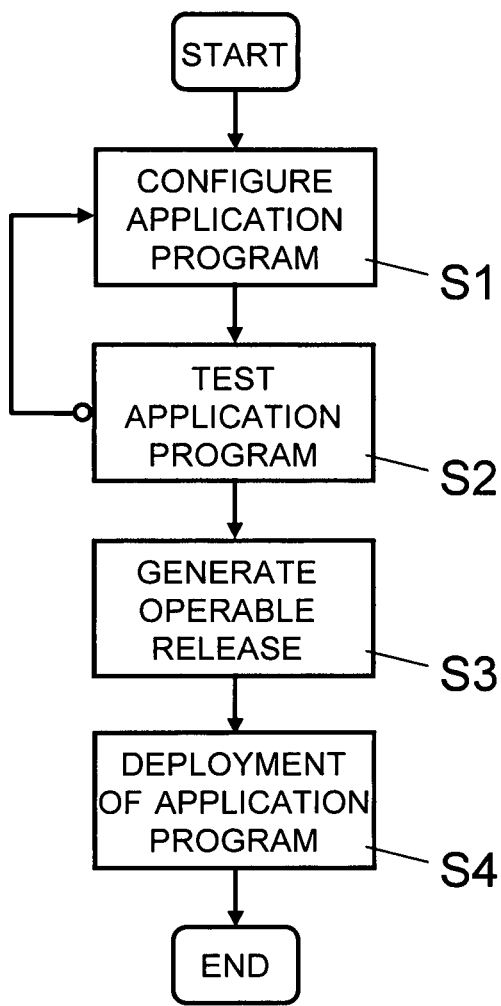
FIG. 4: shows a flow diagram illustrating an exemplary sequence of steps for generating and deploying an application program or an interactive data object.
Figure 5:
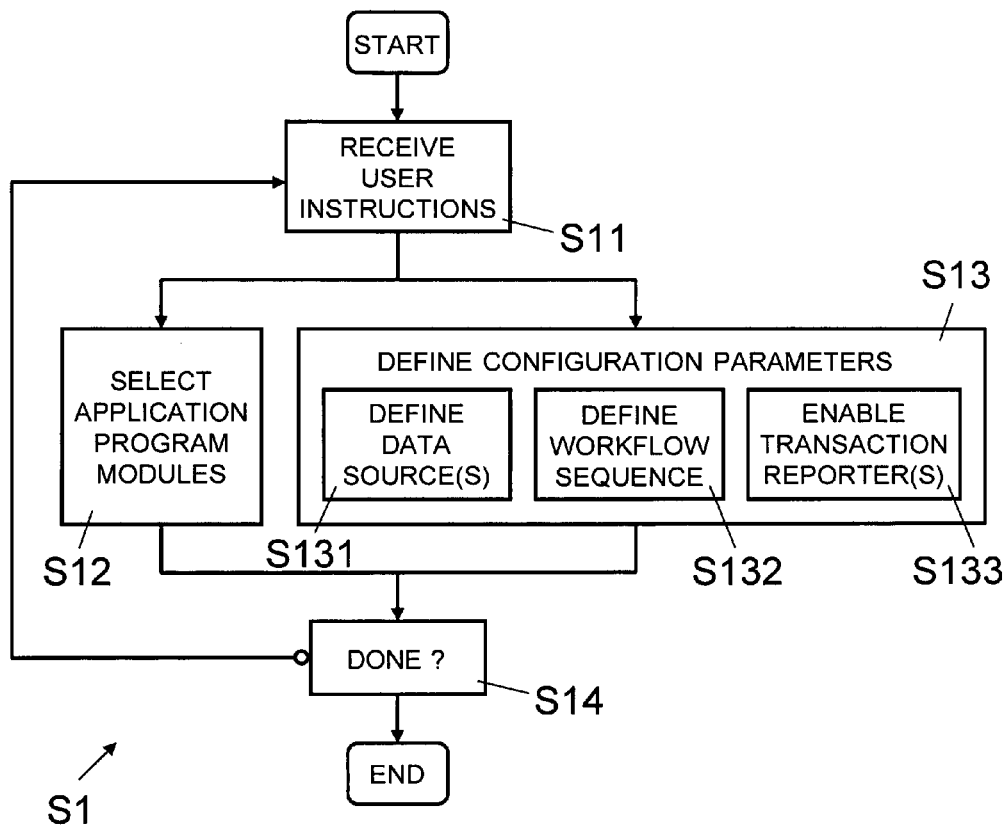
FIG. 5: shows a flow diagram illustrating an exemplary sequence of steps for configuring an application program or an interactive data object.
Figure 6:
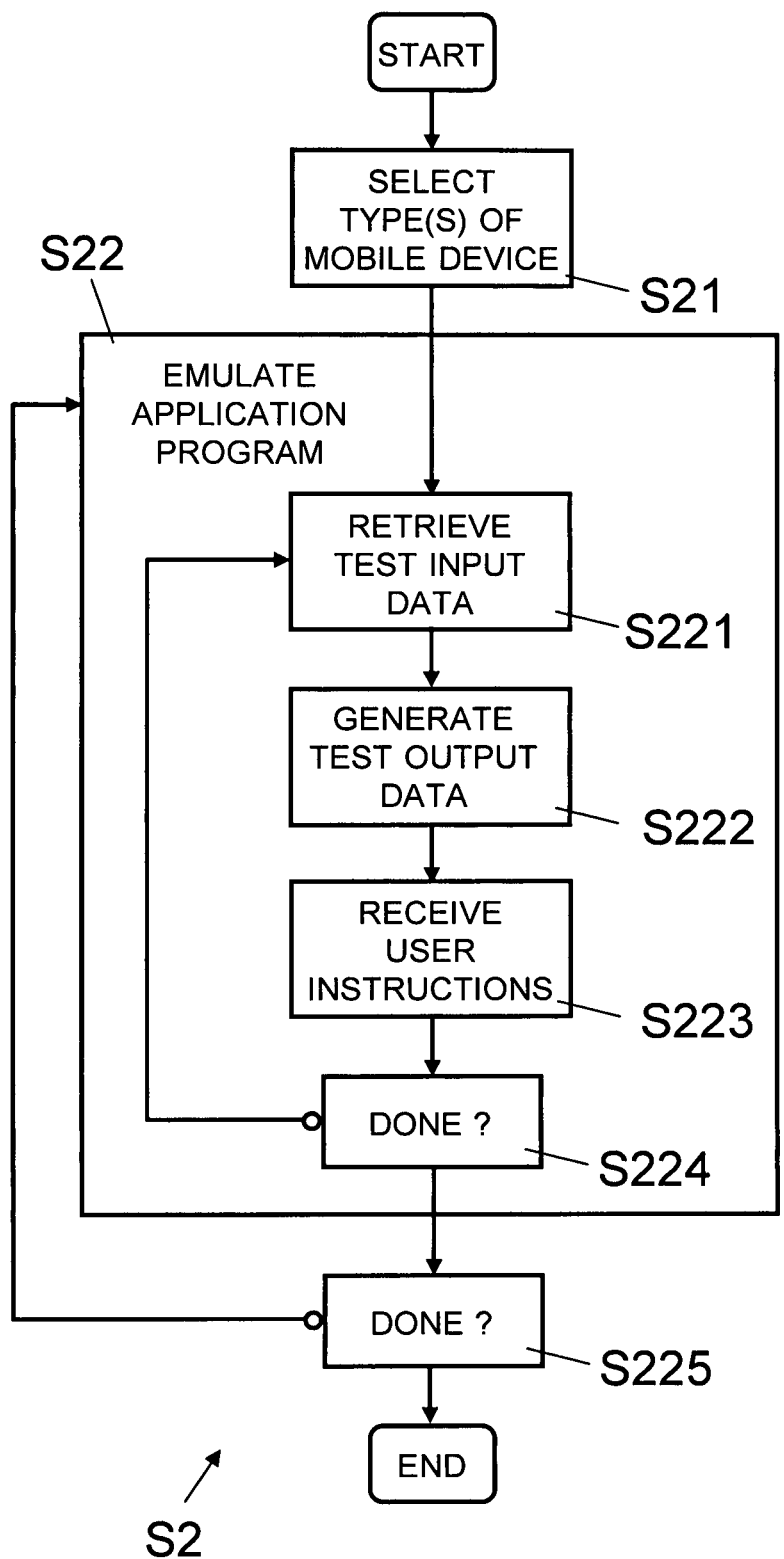
FIG. 6: shows a flow diagram illustrating an exemplary sequence of steps for testing an application program or an interactive data object.

In the following paragraphs, described with reference to FIGS. 4-6 are possible sequences of steps performed by the functional modules of the computerized application platform 1 for generating for the mobile communication devices 5 an operable application program 15 or an interactive data object from one or more application program modules 12.

As illustrated in FIG. 4, generating an operable application program 15 or an interactive data object for the mobile communication devices 5 comprises step S1 for configuring the application program 15 or the interactive data object, step S2 for testing the application program 15 or the interactive data object, step S3 for generating an operable release of the application program 15 or the interactive data object, and step S4 for deploying the application program 15 or the interactive data object. As illustrated in FIG. 4, testing the application program 15 or the interactive data object may be followed by further configuration of the application program 15 or the interactive data object, repeating configuration and testing until the application program 15 or the interactive data object is in a state ready for generating an operable release and deployment.

FIG. 5 illustrates a possible sequence of steps performed by the application configuration module 11 for configuring the application program 15 or the interactive data object in step S1.

In step S11, the application configuration module 11 receives from a developer or from the communication terminal 4 used by the developer, respectively, a user instruction for configuring the application program 15 or the interactive data object. Initially, the application program 15 or the interactive data object may be provided with an identifier, e.g. a name supplied by the developer.

User instructions are entered and received via graphical user interfaces, touch sensitive displays, operating elements such as a computer mouse, a touchpad and/or data entry keys, and/or other means such as a voice controlled user interface.

If the user instruction relates to the selection of one or more application program modules 12, in step S12, the application configuration module 11 stores this selection assigned to the application program 15 or the interactive data object.

If the user instruction relates to the definition of one or more configuration parameters 150, in step S13, the application configuration module 11 stores these configuration parameters 150 assigned to the application program 15 or its application program modules 12 or the interactive data object. Specifically, in step S131, the application configuration module 11 stores the definition 152 of one or more data sources 2, e.g. in form of a URL (Uniform Resource Locator) or link, address, or pointer identifying the data source(s) 2, assigned to the application program 15 or the interactive data object. In step S132, the application configuration module 11 stores the definition of a workflow sequence 155 for the application program modules 12 assigned to the application program 15. The workflow sequence 155 defines the order in which the (selected) application program modules 12 are to be executed. The workflow sequence 155 further defines the implicit flow of data, which is passed from a first application program module 12 to a second application program module 12 that follows the first application program module 12 in the sequence. In step S133, the application configuration module 11 stores one or more configuration parameters 150a, 150b which indicate that transaction reporters 151 are to be activated. As explained above, the transaction reporters 151 are configured to generate and transmit to the computerized application platform 1 a transaction record, upon execution of the respective application program module 12 or its specific function, respectively, on a mobile communication device 5. Depending on the implementation or embodiment, further configuration parameters 150 can be specified by the developer to define additional characteristics of features of the application program 15 or the interactive data object, e.g. data validation rules 154, labels, data entry fields, graphical user elements, data graphs, display effects, interaction capabilities, etc. for the selected application program modules 12. Moreover, in an embodiment, the configuration parameters 150 include the definition of one or more data stores 153, e.g. in form of a URL (Uniform Resource Locator) or link, address, or pointer identifying the data store, where data records and/or transaction records from an application program module 12 related to transaction completion or data storage, or from transaction reporters 151 are to be stored.

As indicated above, the application configuration module 11 makes it possible to define "interactive" data objects comprising a program module 12 and data elements, whereby the program module 12 is configured to show on a display user interface elements enabling user interaction, and to render data elements on the display depending on the user interaction, as will be explained later in more detail. Further configuration parameters can be specified by the developer to define for each of the data elements the different types of mobile communication devices 5 on which the respective data element is to be displayed.

In step S14, the application configuration module 11 checks whether the instruction received from the developer indicates that configuration of the application program 15 or the interactive data object is complete or whether further configuration is required.

FIG. 6 illustrates a possible sequence of steps performed by the testing module 111 for testing the application program 15 or interactive data object in step S2.

In step S21, the testing module 111 selects one or more types of mobile communication devices 5 for testing. In one embodiment, the testing module 111 receives from the developer or the communication terminal 4 used by the developer, respectively, a user instruction for selecting one or more types of mobile communication devices 5 for testing. In a preferred embodiment, the testing module 111 selects automatically one or more types of mobile communication devices 5 for testing based on a compatibility assessment.

Figure 11:
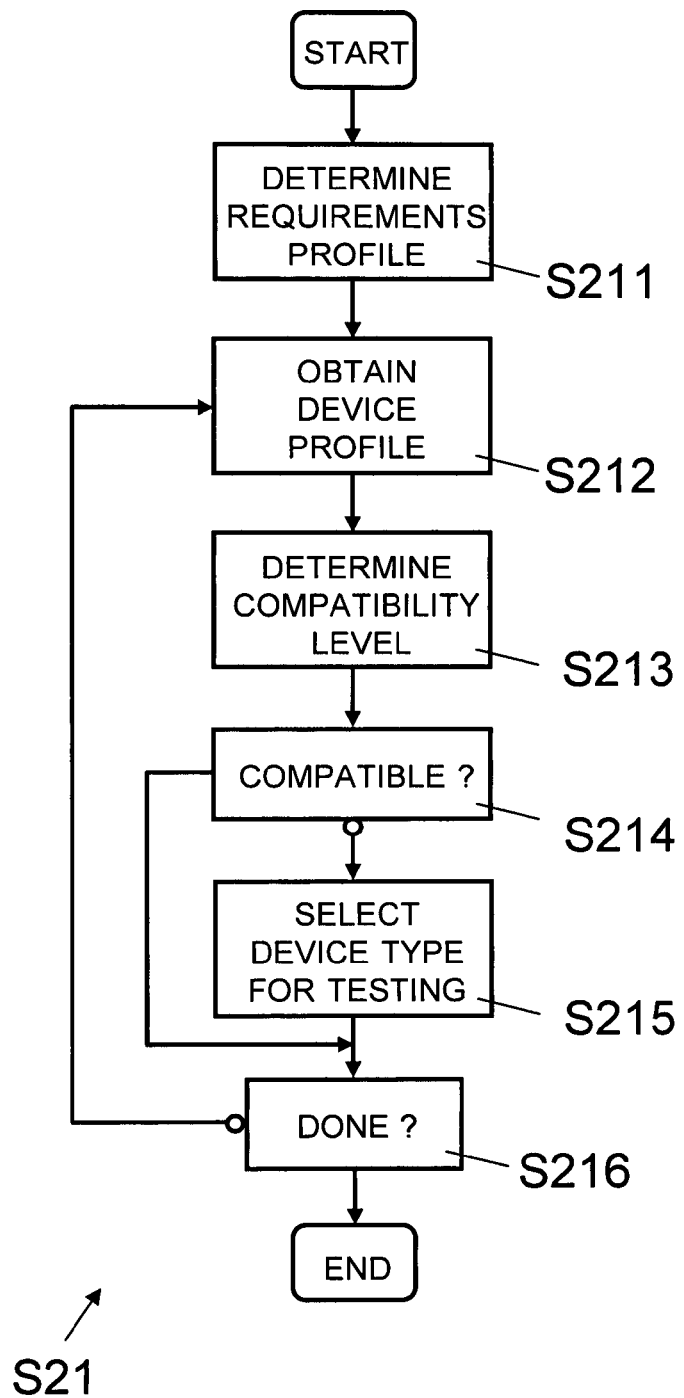
FIG. 11: shows a flow diagram illustrating an exemplary sequence of steps for assessing the compatibility of different types of mobile devices with regards to software and/or hardware requirements of an application program or an interactive data object.

FIG. 11 illustrates a possible sequence of steps performed by the testing module 111 for performing the compatibility assessment and, thereby, determining the compatibility level of the different types of mobile communication devices 5.

In step S211, the testing module 111 determines the requirements profile for the application program 15 or the interactive data object. Specifically, the testing module 111 determines the requirements profile for the application program 15 or the interactive data object by aggregating (i.e. accumulating and combining) the hardware and/or software requirements of all the application program modules 12 and respective configuration parameters 150 of the application program 15 or the interactive data object. For example, the hardware and/or software requirements R11, R12, ..., R1r, R21, R22, ..., R2r, Rn1, Rn2, ..., Rnr for specific application program modules M1, M2, ..., Mn and configuration parameters C11, C12, ..., C1r, C21, C22, ..., C2r, Cn1, Cn2, ..., Cnr are stored in a table or matrix in a data store of the application platform 1, as illustrated schematically in Table 1.

TABLE 1

| Application module | Application Configuration parameters | | | | Software and/or hardware requirements | | | |
|---|---|---|---|---|---|---|---|---|
| M1 | C11 | C12 | ... | C1c | R11 | R12 | ... | R1r |
| ... | ... | ... | ... | ... | ... | ... | ... | ... |
| M1 | C11 | C12 | ... | C1c | R11 | R12 | ... | R1r |
| M2 | C21 | C22 | ... | C2c | R21 | R22 | ... | R2r |
| ... | ... | ... | ... | ... | ... | ... | ... | ... |
| M2 | C21 | C22 | ... | C2c | R21 | R22 | ... | R2r |
| ... | ... | ... | ... | ... | ... | ... | ... | ... |
| Mn | Cn1 | Cn2 | ... | Cnc | Rn1 | Rn2 | ... | Rnr |

Essentially, the requirement profile of an application program 15 or an interactive data object defines the hardware and/or software requirements of that application program 15 or interactive data object related to the interface features, communication features, computing features, and/or software features described above in the context of the device profiles 13.

In step S212, the testing module 111 obtains the devices profile 13 of a particular one of the different types of mobile communication devices 5 which is to be assessed.

In step S213, the testing module 111 determines for the particular type of mobile communication device 5 its compatibility level with regards to the requirements profile of the application program 15 or the interactive data object, using the device profile 13 of the particular type of mobile communication device 5. For example, the compatibility level is calculated from the number of hardware and/or software requirements of the application program 15 or the interactive data object that are met by the respective hardware and/or software characteristics indicated in the device profile 13 of the particular type of mobile communication device 5. Depending on the embodiment and/or configuration, the hardware and/or software requirements are weighted by defined significance factors.

In step S214, the testing module 111 checks whether the particular type of mobile communication device 5 is compatible with the application program 15 or the interactive data object, i.e. whether the particular type of mobile communication device 5 has a defined minimum compatibility level, e.g. by comparing the compatibility level to a minimum compatibility threshold value. If compatibility is determined, i.e. the minimum compatibility level is reached, the testing module 111 proceeds in step S216.

Otherwise, if the particular type of mobile communication device 5 does not meet the minimum compatibility condition, in step S215, the testing module 111 selects the particular type of mobile communication device 5 for testing.

In an embodiment, the testing module 111 checks whether the particular type of mobile communication device 5 is compatible with the application program 15 or the interactive data object based on a use case table or matrix stored in a data store of the application platform 1. As illustrated schematically in Table 2, rather than for specific application program modules 12 and respective configuration parameters 150, the use case table or matrix defines compatibility values V11, V12, ... V1d, V21, V22, ... V2d, Vm1, V1m2, ... V1 md, for the different types of mobile communication devices T1, T2, ..., Td and particular use cases U1, U2, ..., Um. For example, each of the different use cases U1, U2, ..., Um corresponds to a specific set of application program modules 12, a specific set of functions, a specific type of application feature, and/or a specific type of application program 15 or interactive data object. A particular application program 15 or interactive data object may be associated with more than one use case U1, U2, ..., Um. For example, a use case may relate to taking, storing and transmitting photographs; another use case may relate to displaying animated and/or 3D visual objects; yet another use case may relate to zooming in and out of visual objects by way of pinching gestures on a touch screen. Other categories or classes of use cases may relate to specific application types such as forms based data entry, graphical presentation of data, etc.; or fields of application such as claims processing, insurance underwriting, etc.

TABLE 2

| | Types of mobile communication devices | | | |
|---|---|---|---|---|
| Use case | T1 | T2 | ... | Td |
| U1 | V11 | V12 | ... | V1d |
| U2 | V21 | V22 | ... | V2d |
| ... | ... | ... | ... | ... |
| Um | Vm1 | Vm2 | ... | Vmd |

In step S216, the testing module 111 checks whether the compatibility assessment has been performed for all the registered types of mobile communication devices 5 or whether the compatibility assessment is to be continued in step S212 for another type of mobile communication device 5.

As illustrated in FIG. 6, in step S22, the testing module 111 emulates the application program 15 or interactive data object for the one or more selected types of mobile communication devices 5. Thus, the testing module 111 emulates the application program 15 or interactive data object using the device profiles 13 associated with the selected types of mobile communication devices 5. In other words, the testing module 111 operates as an emulator that duplicates on a computer of the application platform 1 the functions of the application program 15 or interactive data object (or its program module 12, respectively), as if it was executing on the selected type(s) of the mobile communication devices 5. The emulated behaviour closely resembles the behaviour of the application program 15 or interactive data object (or its program module 12, respectively) when executed on the respective mobile communication device(s) 5. Specifically, the emulated behaviour reflects the hardware and/or software characteristics of the respective mobile communication device(s) 5, including the interface features, communication features, computing features, and/or software features defined in the respective device profiles 13 described above. Thus, the emulated behaviour reflects not only data output characteristics but also interaction capabilities for the user with the application program or interactive data object or their user interface, respectively.

In step S221, the testing module 111 or the application program 15 or the interactive data object emulated by the testing module 111, respectively, retrieves test input data from a data store of the application platform 1 or one of the data sources 2. The test input data is retrieved as required by the emulated application program 15 or the interactive data object. The test input data corresponds to the data of the data sources 2 associated with the application program 15 or the interactive data object. Specifically, the test input data has a data structure and data values corresponding to those of the respective data sources, e.g. the test input data is a subset of the data sources 2 associated with the application program 15 or the interactive data object. The data elements include textual ("text") and numerical ("numbers") data values. The data values are linked to configuration parameters. Table 3 shows the input data structured in a data object, that comprises data elements DE1, DE2, DE3, . . . , DEe with data values, and configuration parameters linked to the data elements or data values, respectively. As illustrated in Table 3, the configuration parameters indicate for each of the data elements DE1, DE2, DE3, . . . , DEe the different types T1, T2, T3, . . . , Td of mobile communication devices 5 on which the respective data element DE1, DE2, DE3, . . . , DEe is to be displayed "X" and whether the data element DE1, DE2, DE3, . . . , DEe has to be displayed as a mandatory data element "M" on the display screens of the different types T1, T2, T3, . . . , Td of mobile communication devices 5. In the example of Table 3, the data object is implemented as an "interactive" data object and further comprises a program module 12.

TABLE 3

| | Data object | | | | |
| | Program module | | | | |
| Data elements of input data | Configuration parameters for different types of mobile communication devices | | | | |
| | T1 | T2 | T3 | . . . | Td |
| DE1 | M | M | M | . . . | M |
| DE2 | M | M | X | . . . | — |
| DE3 | M | X | — | . . . | — |
| . . . | . . . | . . . | | . . . | . . . |
| DEe | X | X | — | . . . | — |

As indicated in the example of Table 3, data element DE1 is to be displayed as a mandatory data element on display screens of device types T1, T2, T3, . . . , Td; data element DE2 is to be displayed as a mandatory data element on device types T1 and T2, as a non mandatory data element on device type T3, but is not to be displayed on device type Td; data element DE3 is to be displayed as a mandatory data element on device type T1, as a non mandatory data element on device type T2, but is not to be displayed on device types T3, Td; and data element DEe is to be displayed as a non mandatory data element on device types T1 and T2, but is not to be displayed on device types T3, and Td. One skilled in the art will understand that, depending on application and embodiment, the configuration parameters further or alternatively indicate for the data elements DE1, DE2, DE3, . . . , DEe not only whether or not they are mandatory, but a specific page number or display level on which they have to displayed, whereby a first page or top level indicates that a data element is visible to the user, without the necessity of any further screen manipulations by the user, whereas other page numbers or levels require the user to perform paging or browsing operations, before the data element is visible on the display screen of the mobile communication device 5. In an embodiment, the configuration parameters indicate for the data elements DE1, DE2, DE3, . . . , DEe the maximum number of user manipulations that is acceptable before the respective data element DE1, DE2, DE3, . . . , DEe is rendered and visible for the user; for example, a value of "zero" indicates a mandatory data element DE1, DE2, DE3, . . . , DEe that is to be rendered for the user on the first page or top display level, without any screen manipulations necessary from the user; whereas a value of "one" indicates a data element DE1, DE2, DE3, . . . , DEe that is to be rendered for the user on a second page or display level, requiring just one screen manipulation from the user, before it is rendered and visible for the user on the display screen.

In an embodiment, the "interactive" data object is configured, as described in US 2014/0237349, as an object having a non-variable first part and a variable second part, which is separate from the non-variable first part. The non-variable first part comprises the program module 12 with instructions configured to direct a processing unit to perform a function call in response to user interaction. The variable second part comprises the data elements and functions defined to return the data elements in response to the function call. Specifically, the instructions are configured to direct the processing unit to show on a display user interface elements enabling the user interaction, and to perform the function call depending on the user interaction, and to show on the display the variable data returned in response to the function call.

In step S222, the testing module 111 or the application program 15 or interactive data object emulated by the testing module 111, respectively, generates test output data. The test output data is generated by the application program 15 or interactive data object (or its program module 12, respectively) as emulated for the selected type(s) of mobile communication devices 5. The test output data includes representations of display screens generated by emulating the application program modules 12 of the application program 15 or the interactive data object for the selected type(s) of mobile communication devices 5. Specifically, the representations of display screens correspond in size of display screen and/or resolution of display screen to those of the selected type(s) of mobile communication devices 5, as defined by the respective device profile 13. The generated representations of display screens may be static or dynamic, i.e. animated, and represented visual objects may be in 2D and/or 3D. As described above in the context of FIGS. 7-9, depending on the category, class or group of application program module 12, the test output data is related to data entry, graphical data representation, or entry of a signature, for example. The test output data is generated by the emulated application program 15 or the emulated application program modules 12 or the interactive data object, respectively, based on related test input data. For example, the test data output generated by emulating an application program module 12 related to graphical data representation is based on the actual test input data associated with the application program module 12, thus, the data graphs 452 shown in FIG. 8 would reflect the actual data values of the respective test input data.

Figure 3:
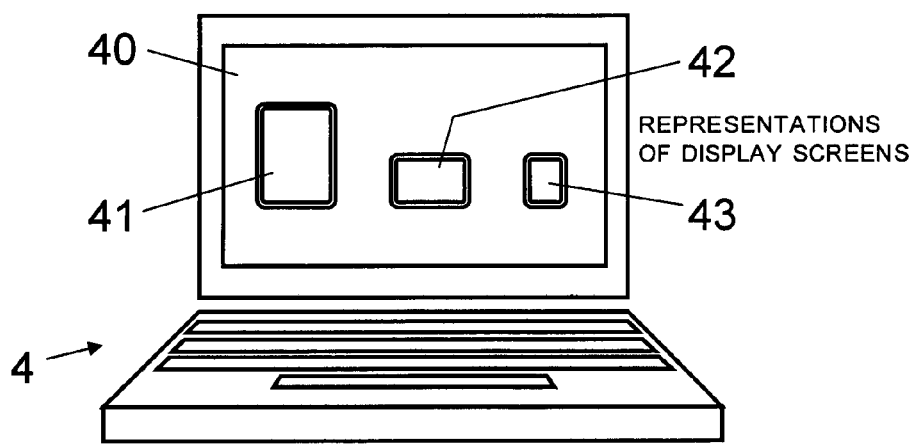
FIG. 3: shows a schematic depiction of a communication terminal showing on its display several representations of emulated display screens of different types of mobile communication devices.

The generated test output data is transmitted by the testing module 111 to the communication terminal 4 used by the developer testing the application program 15 or the interactive data object. FIG. 3 shows an example of a communication terminal 4 with a display 40 that has displayed thereon (concurrent) representations of display screens 41, 42, 43 of three selected type(s) of mobile communication devices 5, the display screens having different sizes and/or resolutions, as defined by the respective device profiles 13. The test output data generated by the emulated application program 15 or the emulated application program modules 12 or interactive data object, respectively, is displayed as content in the representations of the display screen 41, 42, 43 of the respective type of mobile communication devices 5. As described above in the context of FIGS. 7-9, the test output data or the representations of display screens, respectively, are related to data entry, data representation, graphical data representation, or entry of a signature, for example. Thus, the display screens 41, 42, 43 shown to the developer on his communication terminal 4 represent the emulated user interface of the types of mobile communication devices 5 selected for testing, including its interaction capabilities.

Figure 12:
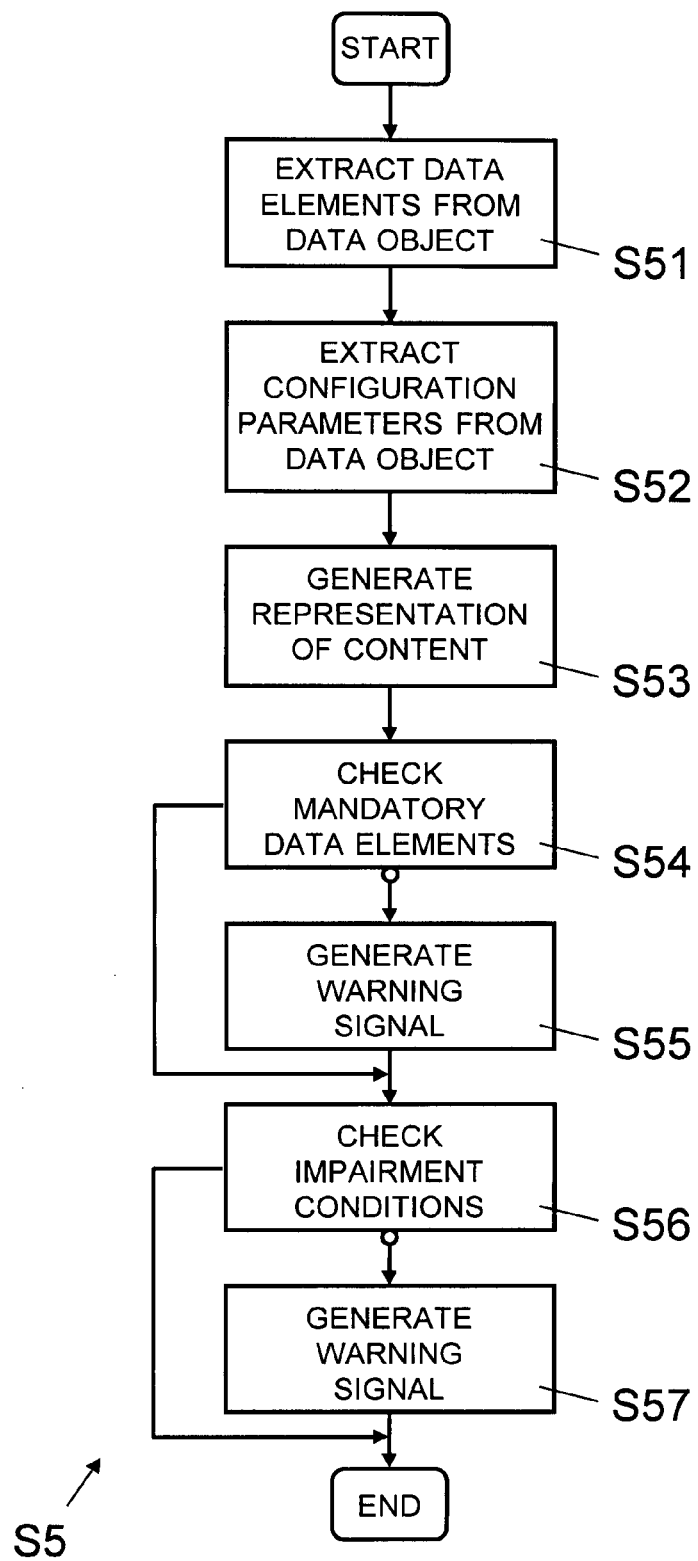
FIG. 12: shows a flow diagram illustrating an exemplary sequence of steps for testing data representation for displays of different types of mobile communication devices.

FIG. 12 illustrates an exemplary sequence of steps S51, S52, S53, S54, S55, S56, S57 (S51-S57) for testing data representation for displays of different types of mobile communication devices 5, i.e. the representation of the input data with the textual and numeric data values of its data elements on displays of the different types of mobile communication devices 5. The steps S51-S57 for testing the data representation are performed as part of step S222, described above, or as a process S5 executed independently for a specific interactive or non-interactive data object for a defined set of different types of mobile communication devices 5.

In step S51, the testing module 111 extracts the data elements from the data object.

In step S52, the testing module 111 extracts the configuration parameters for the data elements from the data object. In case of an "interactive" data object, the testing module 111 further extracts the program module 12 from the data object.

In step S53, the testing module 111 generates a representation of content for the emulated display screens 41, 42, 43 of the different types of mobile communication devices 5, using the extracted data elements, configuration parameters, and the program module 12, if applicable. Specifically, the testing module 111 determines from the configuration parameters which of the data elements or their textual and/or numerical data values, respectively, are to be displayed, as mandatory "M" (top page or display level, without need for user interaction before rendering) or non-mandatory "X" (lower page or display level, with user interaction required prior to rendering) data elements on the display screens of which mobile communication devices 5. Subsequently, the testing module 111 generates a representation of the emulated display screens 41, 42, 43, including an emulated rendering of the determined data elements in the emulated display screens 41, 42, 43 of the types of mobile communication devices 5 as defined by the configuration parameters. In case of an "interactive" data object, the testing module 111 emulates the program module 12 extracted from the data object and, thus, generates user interface elements in the emulated display screens 41, 42, 43, as directed by the program module 12. Accordingly, the representation of the emulated display screens 41, 42, 43 further includes an emulated rendering of the user interface elements. The emulated user interface elements enable user interaction and a presentation of input data as content in the emulated display screens 41, 42, 43, in response to the user interaction. The representation of the emulated display screens 41, 42, 43 is configured for rendering on a developer's display screen 40, as illustrated in FIG. 3, making it possible for the developer not only to review and compare the concurrent presentation of the emulated display screens 41, 42, 43 and the respective emulated rendering of data elements and their data values, but also to interact with emulated user interface elements for testing the rendering of non-mandatory (lower page or display level) data elements that are rendered in response to the user interaction.

In step S54, the testing module 111 checks the emulated rendering of those data elements that are defined as mandatory data elements by the linked configuration parameters. As described above, mandatory data elements must be displayed on display screen of certain types of mobile communication devices 5, or, if applicable, on a specific page or display hierarchy level, without the necessity of any further screen manipulations by the user. Using the configuration parameters, the testing module 111 checks in the generated content representation of the emulated display screens 41, 42, 43 whether the mandatory data elements are indeed rendered in the emulated display screens 41, 42, 43, specifically, without the need for further user manipulations at the required page or hierarchy level. In other words, the testing module 111 checks whether the (mandatory) data elements, as generated in the respective content representation, will be displayed in the viewport of the mobile communication devices 5, as required by the configuration parameters (this is a simple geometric test to determine whether the respective text is presented inside the rectangle of the viewport of the device).

In case a mandatory data element is not rendered in the generated content representation of the emulated display screens 41, 42, 43 or at the required page or level, respectively, in step S55, the testing module 111 generates a warning signal. The warning signal indicates to the developer the missing or improperly rendered mandatory data element and the emulated display screen(s) 41, 42, 43 where the incorrect rendering occurred.

In step S56, the testing module 111 checks the emulated rendering of the data elements with regards to one or more visual impairment conditions, such as visibility for colour blindness, a minimum font size, and/or a minimum readability score. For checking the visibility for colour blindness, the testing module 111 employs colour filters to reduce the rendering of the data elements to gray scale and subsequently checks, using image processing algorithms, whether or not the values of the data elements can be derived from the gray scale rendering. For checking the minimum font size, the testing module 111 determines the number of points of the rendered textual and numeric data values and compares the number of points to the number of points of a defined minimum font size, e.g. 6 points. In a variant, the minimum font size is defined by the configuration parameters individually for the different data elements. For checking general readability, the testing module 111 determines for the rendered data elements a readability score from the font size, background contrast, colour, and font type, and compares the readability score to a defined minimum readability score.

In case a data element is not rendered with visibility for colour blindness, a minimum font size, and/or a minimum readability score, in step S57, the testing module 111 generates a warning signal. The warning signal indicates to the developer the impairment condition(s) that were met insufficiently and the effected rendered data element and emulated display screen(s) 41, 42, 43.

In step S223, the testing module 111 or the application program 15 or interactive data object emulated by the testing module 111, respectively, receives user instructions. Using the interaction capabilities of the respective type of mobile communication device 5 and the emulated application program 15 or interactive data object, the user instructions may relate to navigating through the emulated application program 15 or its emulated application program modules 12, entering test user input data, or entering a signature, for example. Depending on the user instructions, the testing module 111 further emulates the application program 15 and its application program modules 12 or the interactive data object. Specifically, the user instructions are received from the developer or his communication terminal 4, respectively, through the emulated user interfaces which are rendered in the display screens 41, 42, 43 of the types of mobile communication devices 5 selected for testing. Thus, the test output data not only includes representations of display screens with data content but also provides for related interaction capabilities which depend on the particular type of mobile communication device and may include data entry through hardware based keys and/or through a touch screen, as well as manipulations and/or navigation by way of multi touch screen gestures such as swiping, pinching, spreading, etc. In an embodiment, the emulation of the application program 15 and its application program modules 12 or the interactive data object reflects the speed of processor and/or size of memory of the selected types of mobile communication devices 5. Specifically, the data output and application navigation is emulated so that the application response time and behaviour corresponds to that of the application program 15 and its application program modules 12 or the interactive data object executing on a respective mobile communication devices 5 with the particular speed of processor and/or size of memory.

In step S224, the testing module 111 checks whether the user instruction received from the developer indicates that testing of the application program 15 or the interactive data object is complete or whether further testing or configuration is required. If further configuration is required, the application configuration module 11 returns to step S1 for further and revised configuration of the application program 15 or the interactive data object, receiving from the developer or the communication module 4 used by the developer, respectively, alternate instructions defining a revised selection of the application program modules 12, changed definition of workflow sequence 155 and/or alternate configuration parameters 150 for the application program 15 and/or its application program modules 12 or the interactive data object.

In step S225, the testing module 111 checks whether all the types of mobile communication devices 5 that were selected for testing have been tested or whether there are more types of mobile communication devices 5 that need to be tested. If further types of mobile communication devices 5 remain to be tested, the testing module 111 returns to step S22 or S221, respectively, for emulating and testing the application program 15 or interactive data object for another one of the remaining types of mobile communication devices 5.

Once, configuration and testing is complete and/or an instruction with a request for deployment is received from the developer, in step S3, the deployment module 112 generates an operable release of the application program 15 or interactive data object. The deployment module 112 generates the operable release using the finalized selection of the application program modules 12, definition of workflow sequence 155, and specification of configuration parameters 150 for the application program 15, application program modules 12, or interactive data object, as applicable. For example, the operable release of the application program 15 or the interactive data object is generated as an applet that can be executed or interpreted on processors or virtual machines (e.g. a Java Virtual Machine) of the mobile communication devices 5, respectively. The operable release of the application program 15 or interactive data object is stored in a data store of the operations platform 1b. In the data store of the operations platform 1b, the operable release of the application program 15 or the interactive data object is assigned a status value that indicates for the application program 15 or the interactive data object a state of "deployed". In an embodiment, the deployment module 112 generates and stores in the transaction log 14 a deployment transaction record. The deployment transaction record includes the time of deployment, at least a subset of the operable release of the application program 15 or the interactive data object, and a cryptographic signature by the application platform 1 and/or the respective developer. The operable release of the application program 15 or the interactive data object may further be assigned to a defined target user group, e.g. customers of the application platform 1 or some of their authorized employees.

In an embodiment, the deployment module 112 is further configured to receive from a user of a communication terminal 4 a rollback instruction for "un-deploying" an application program 15 or an interactive data object. Upon receiving such a rollback instruction, the deployment module 112 changes the state of the respective application program 15 or the interactive data object from "deployed" to "disabled". In the "disabled" state, application programs 15 or the interactive data objects are no longer available for downloading to the mobile communication devices 5. Furthermore, application programs 15 or interactive data objects having a "disabled" state may be blocked from accessing any data sources 2 and/or stores associated with the application program 15 or the interactive data object. Moreover, in a variant, the deployment module 112 generates and stores in the transaction log 14 a rollback transaction record. The rollback transaction record includes the time of rollback and a cryptographic signature of the rolled-back application program 15 or the interactive data object. In a further embodiment, during a rollback, the deployment module 112 assigns the "deployed" state to an older or newer operable release of the application program 15 or the interactive data object and generates a respective deployment transaction record.

The downloader 16 is configured to transmit (download) the operable release of the application program 15 or the interactive data object to the mobile communication devices 5, in response to instructions with a download request received from users of the mobile communication devices 5.

In an embodiment, the downloader 16 is configured as part of an (Internet based) application store. Thus, the application platform 1 is configured for automatic deployment of operable application programs 15 or interactive data objects, directly through its own download server or via an application store.

The transaction recorder 17 is configured to store in the transaction log 14 functional transaction records received from application programs 15 running on the mobile communication devices 5. Functional transaction records are generated and transmitted by enabled transaction reporters 151 of application programs 15 upon execution of the respective application program module 12, 12a, 12b or its specific function 120a, 120b, respectively, on a mobile communication device 5. The functional transaction records include the time of execution, an identifier associated with the respective application program module 12, 12a, 12b or function 120a, 120b that triggered generation of the transaction report, an identifier of the mobile communication device 5 or its user, and/or a cryptographic signature by the application program 15.

The transaction reporters, transaction recorder 17, and transaction log 14 constitute an auditing system which generates and stores transaction records to form an audit trail in adherence to auditing and regulatory requirements. The transaction records are stored in the transaction log 14 as audit trail in a secured, non-falsifiable fashion, providing proof for the execution of specific actions or transactions, particularly with regards to the application platform 1, at a specific point in time, and by a specific person.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A computer-implemented method of testing data representation for displays of different types of mobile communication devices, the method comprising:
    storing a plurality of device profiles, each device profile including a size of a display screen and a resolution of the display screen of one of the different types of mobile communication devices;
    emulating, by a processor, of display screens of the different types of mobile communication devices, the emulated display screens having different sizes and resolutions, as defined by the respective device profiles;
    showing, by the processor, of representations of a plurality of the emulated display screens concurrently on a display of a developer;
    retrieving, by the processor, of input data from a data source; and
    displaying, by the processor, of the input data as content in the representations of the plurality of the emulated display screens concurrently on the display of the developer
    receiving, by the processor, for data elements of the input data a configuration parameter that indicates for a data element whether it is to be displayed as a mandatory data element on all of the representations of the plurality of the emulated display screens;
    checking, by the processor, whether the mandatory data element is displayed concurrently in all of the representations of the plurality of the emulated display screens; and
    generating, by the processor, a warning signal when the mandatory data element is not displayed concurrently in all of the representations of the plurality of the emulated display screens.

2. The computer-implemented method of claim 1, further comprising the processor emulating a program module for the different types of mobile communication devices, using hardware and software characteristics of the different types of mobile communication devices included in the device profiles, the emulated program module generating a presentation of the input data as content in each of the emulated display screens, the content presentation corresponding to a presentation generated by a processor of the respective type of mobile communication device under direction of the program module.

3. The computer-implemented method of claim 1, further comprising the processor emulating a program module for the different types of mobile communication devices, using hardware and software characteristics of the different types of mobile communication devices included in the device profiles, the emulated program module generating in each of the emulated display screens a user interface element that enables user interaction and displaying the input data as content in the representations of the emulated display screens in response to the user interaction, the user interface element corresponding to a user interface element generated by a processor of the respective type of mobile communication device under direction of the program module.

4. The computer-implemented method of claim 1, further comprising the processor retrieving from the data source an interactive data object, extracting from the interactive data object the input data and a program module, emulating the program module for the different types of mobile communication devices, using hardware and software characteristics of the different types of mobile communication devices included in the device profiles, the emulated program module generating in each of the emulated display screens a user interface element that enables user interaction and generating a presentation of the input data as content in each of the emulated display screens in response to the user interaction, the user interface element corresponding to a user interface element generated by a processor of the respective type of mobile communication device under direction of the program module and the content presentation corresponding to a presentation generated by a processor of the respective type of mobile communication device under direction of the program module.

5. The computer-implemented method of claim 1, further comprising the processor retrieving from the data source a data object, extracting from the data object the input data and configuration parameters that indicate for data elements of the input data the types of mobile communication devices on which the respective data element is to be displayed, and displaying the data elements respectively in the representations of the emulated display screens of those type of mobile communication devices indicated by the configuration parameters.

6. The computer-implemented method of claim 1, further comprising the processor checking whether the input data displayed as content in the representations of the emulated display screens meets at least one of the following visual impairment conditions: visibility for colour blindness, minimum font size, and a minimum readability score.

7. A computerized development platform for testing data representation for displays of different types of mobile communication devices, the development platform comprising:
- a non-transitory computer readable data storage medium having stored thereon a plurality of device profiles, each device profile including a size of a display screen and a resolution of the display screen of one of the different types of mobile communication devices; and
- one or more hardware processors configured to execute computer readable instructions that configure the one or more hardware processors to:
  - emulate display screens of the different types of mobile communication devices, the emulated display screens having different sizes and resolutions, as defined by the respective device profiles,
  - show representations of a plurality of the emulated display screens concurrently on a display of a developer,
  - retrieve input data from a data source,
  - display the input data as content in the representations of the plurality of the emulated display screens concurrently on the display of the developer;
  - receive for data elements of the input data a configuration parameter that indicates for a data element whether it is to be displayed as a mandatory data element on all of the representations of the plurality of the emulated display screens;
  - check whether the mandatory data element is displayed concurrently in all of the representations of the plurality of the emulated display screens; and
  - generate a warning signal when the mandatory data element is not displayed concurrently in all of the representations of the plurality of the emulated display screens.

8. The computerized development platform of claim 7, wherein the computer readable instructions further configure the processors to emulate a program module for the different types of mobile communication devices, using hardware and software characteristics of the different types of mobile communication devices included in the device profiles, the emulated program module generating a presentation of the input data as content in each of the emulated display screens, the presentation of content corresponding to a presentation generated by a processor of the respective type of mobile communication device under direction of the program module.

9. The computerized development platform of claim 7, wherein the computer readable instructions further configure the processors to emulate a program module for the different types of mobile communication devices, using hardware and software characteristics of the different types of mobile communication devices included in the device profiles, the emulated program module generating in each of the emulated display screens a user interface element, that enables user interaction, and displaying the input data as content in the representations of the emulated display screens, in response to the user interaction, the user interface element corresponding to a user interface element generated by a processor of the respective type of mobile communication device under direction of the program module.

10. The computerized development platform of claim 7, wherein the computer readable instructions further configure the processors to retrieve from the data source an interactive data object, to extract from the interactive data object the input data and a program module, to emulate the program module for the different types of mobile communication devices, using hardware and software characteristics of the different types of mobile communication devices included in the device profiles, the emulated program module generating in each of the emulated display screens a user interface element, that enables user interaction, and a presentation of the input data as content in each of the emulated display screens, in response to the user interaction, the user interface element corresponding to a user interface element generated by a processor of the respective type of mobile communication device under direction of the program module, and the presentation of content corresponding to a presentation generated by a processor of the respective type of mobile communication device under direction of the program module.

11. The computerized development platform of claim 7, wherein the computer readable instructions further configure the processors to retrieve from the data source a data object, to extract from the data object the input data and configuration parameters that indicate for data elements of the input data the types of mobile communication devices on which the respective data element is to be displayed, and to display the data elements respectively in the representations of the emulated display screens of those types of mobile communication devices indicated by the configuration parameters.

12. The computerized development platform of claim 7, wherein the computer readable instructions further configure the processors to check whether the input data displayed as content in the representations of the emulated display screens meets at least one of the following visual impairment conditions: visibility for colour blindness, minimum font size, and a minimum readability score.

13. A computer program product comprising a non-transitory computer readable medium having stored thereon computer program code configured to control one or more processors of a development platform for testing data representation for displays of different types of mobile communication devices, such that the development platform performs the steps of:
- storing a plurality of device profiles, each device profile including a size of a display screen and a resolution of the display screen of one of the different types of mobile communication devices;
- emulating display screens of the different types of mobile communication devices, the emulated display screens having different sizes and resolutions, as defined by the respective device profiles;
- showing representations of a plurality of the emulated display screens concurrently on a display of a developer;
- retrieving input data from a data source; and
- displaying the input data as content in the representations of the plurality of the emulated display screens concurrently on the display of the developer
- receiving for data elements of the input data a configuration parameter that indicates for a data element whether it is to be displayed as a mandatory data element on all of the representations of the plurality of the emulated display screens;
- checking whether the mandatory data element is displayed concurrently in all of the representations of the plurality of the emulated display screens; and
- generating a warning signal when the mandatory data element is not displayed concurrently in all of the representations of the plurality of the emulated display screens.

* * * * *

UNITED STATES PATENT AND TRADEMARK OFFICE
CERTIFICATE OF CORRECTION

PATENT NO. : 9,940,221 B2
APPLICATION NO. : 15/039228
DATED : April 10, 2018
INVENTOR(S) : Jan Knoulich Page 1 of 1

It is certified that error appears in the above-identified patent and that said Letters Patent is hereby corrected as shown below:

In Column 8 at Line 67, Change "1by" to --1 by--.

In Column 9 at Line 4, Change "1by" to --1 by--.

In Column 9 at Line 26, Change "1by" to --1 by--.

In Column 9 at Line 34, Change "1by" to --1 by--.

In Column 13 at Lines 34-35, Change "Application Configuration parameters" to --Configuration parameters--.

In Column 14 at Lines 24, Change "V1 md," to --V1md,--.

Signed and Sealed this
Twenty-fifth Day of September, 2018

Andrei Iancu
*Director of the United States Patent and Trademark Office*